March 30, 1948.  L. S. GREENLAND  2,438,662
FUEL INJECTION SYSTEM FOR INTERNAL-COMBUSTION ENGINES
Filed Dec. 29, 1945
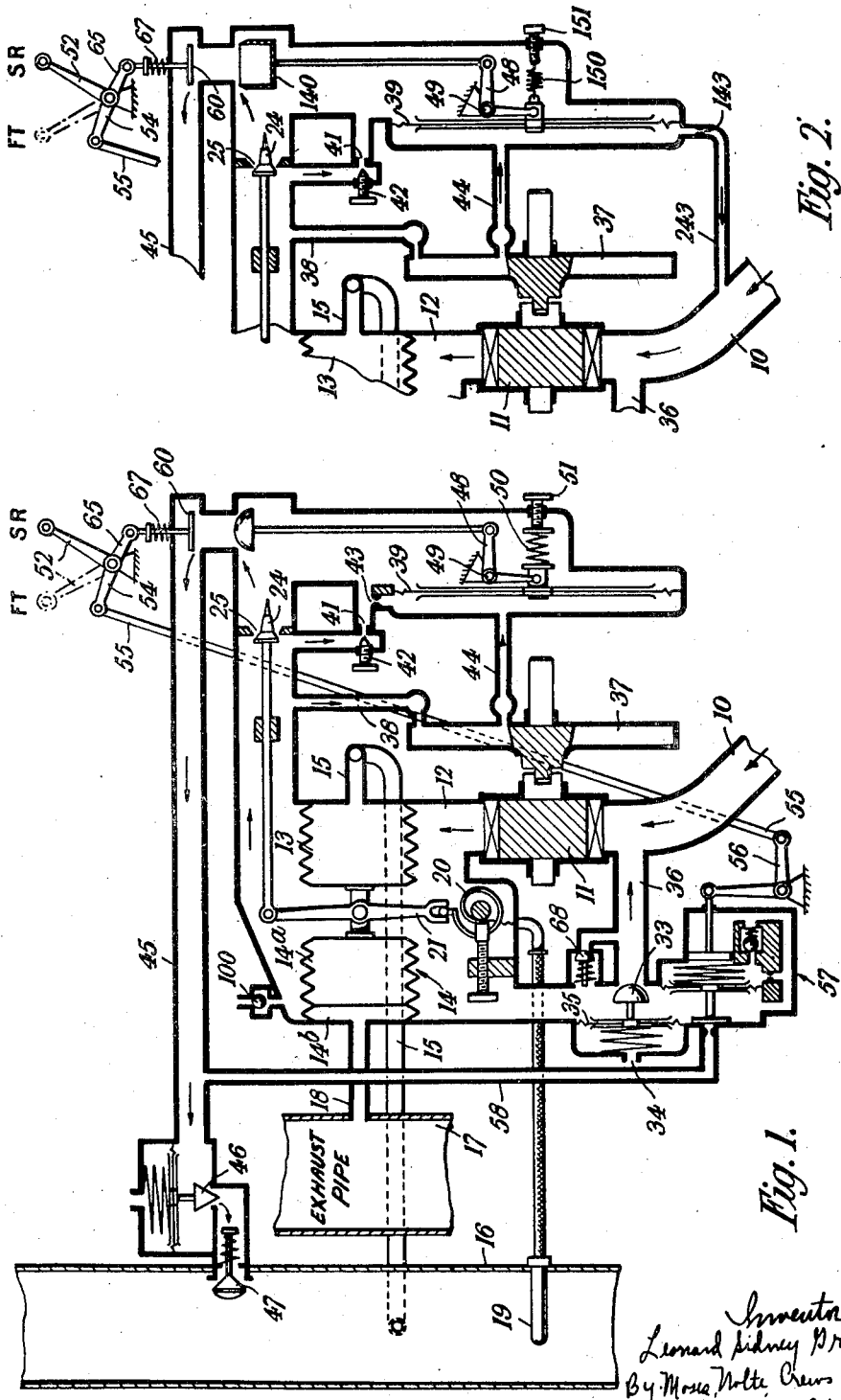

Patented Mar. 30, 1948

2,438,662

UNITED STATES PATENT OFFICE 2,438,662

FUEL INJECTION SYSTEM FOR INTERNAL-COMBUSTION ENGINES

Leonard Sidney Greenland, Weston-super-Mare, England, assignor to H. M. Hobson Limited, London, England, a company of Great Britain Application December 29, 1945, Serial No. 638,128
In Great Britain February 12, 1945

9 Claims. (Cl. 123—119)

This invention relates to fuel injection systems for internal combustion engines of the type in which the fuel is fed under pressure through a conduit including a metering orifice, and in which the pressure difference across the orifice is maintained approximately proportional to the square of the engine speed by means of an engine driven centrifugal impeller, a pressure regulating valve located on the downstream side of the metering orifice and a diaphragm or the equivalent controlling said valve, the diaphragm being subject on one side to the fuel pressure at the exit side of the metering orifice and at the other to the pressure at the eye of the impeller, and the tip of the impeller communicating with the conduit on the entry side of the metering orifice.

According to the invention, a slow running adjustment is provided in a system of the above character by application to the diaphragm of a biasing force which is small in comparison with the pressure difference across the metering orifice under cruising conditions of the engine or at higher speeds, but is effective, under slow running conditions, to modify the effect of the impeller on the metering pressure to the extent required at slow running.

It will be understood that broadly speaking, it is required that the metering pressure (i. e. the pressure difference prevailing across the metering orifice) should be proportional to the square of the engine speed, and that this will result in a flow of fuel through the orifice which is directly proportional to engine speed. This result is achieved if the impeller is the sole agency for controlling the metering pressure. However, at slow running an enrichment in mixture strength is generally required as compared with that determined by the square law curve of the impeller, although in the case of engines exhibiting a large degree of boost reversal, a weakening in mixture strength is required at slow running.

The application of a biasing force to the diaphragm will involve a departure from the square law relationship of metering pressure to engine speed. By suitable selection of the biasing force, however, its effect on the square law relationship can be made negligible at the higher speeds while providing for the required modification in the fuel flow at slow running.

Thus, in a typical example, the speed of an aero engine at slow running may be of the order of 400 R. P. M. and the metering pressure under these conditions be about 0.3 inch of mercury. If the bias applied to the diaphragm is of the order of 2 inches of fuel pressure then this represents a reasonable proportion of the total metering head and could be used as an adjustment on a total quantity of fuel for the engine at slow running. When the engine speed is increased, however, to its maximum, the metering pressure is more of the order of 10 inches of mercury and the strength of the biasing force will remain equivalent to 2 inches of fuel; thus the bias due to the slow running adjustment is so small as to be negligible compared with the full metering pressure at maximum speed and its effect on the square law curve over the higher speed range of the engine will be so small as to be negligible.

In the example under consideration the minimum cruising speed would be of the order of 1500 R. P. M. and maximum speed 2700 R. P. M. Thus from a fuel economy and performance viewpoint, speeds below 1500 R. P. M. are not important and strict approximation to the square law can be disregarded, but it is important that an adjustment be provided to give good slow running characteristics at the lowest speed of 400 R. P. M.

I prefer to employ a spring for applying the biasing force to the diaphragm, and where it serves to apply a positive bias, i. e. to maintain the fuel pressure at the side of the diaphragm exposed to the eye of the impeller in excess of that at the side exposed to the pressure at the exit side of the metering orifice, the result will be an enrichment of the mixture at slow running. In this case the spring can also be employed to produce a pressure difference appropriate for venting across a venting orifice between the eye of the impeller and a point in the fuel conduit between the eye of the impeller and the pressure regulating valve. This vent connection permits of restricted flow of fuel from the eye of the impeller to the downstream side of the metering orifice and allows of the escape of air or vapour which might otherwise collect at the eye of the impeller. It would not be satisfactory to vent the eye of the impeller to the downstream side of the pressure regulating valve because there would then be a large pressure difference across the venting orifice, with the result that a very small vent hole must be used, with consequent danger of stoppage by impurities in the fuel, or else there would be a large flow through the vent connection, which is undesirable because this would cause an excessive departure from the desired square law characteristic of the impeller. The pressure difference established across the venting orifice by the spring which applies bias to the diaphragm is, however, small, with the result that the venting orifice may be made reasonably large and adequate in most cases to pass any foreign matter contained in the fuel. As an alternative however to producing a positive bias the spring can be arranged to produce a negative bias and, in this case, the fuel flow will be reduced at slow running.

Where the pressure regulating valve is of the unbalanced type, the spring may also be utilised to counter-balance forces exerted by the fuel on the valve, by application to the spring of loading additional to that required to bias the diaphragm.

Two alternative forms of fuel injection system according to the invention for use in aircraft engines will now be described in detail, by way of example, with reference to the accompanying drawing, in which the two systems are shown diagrammatically in Figs. 1 and 2 respectively. Like reference characters designate like parts in the two figures.

In the arrangement shown in Fig. 1, fuel delivered from an inlet 10 by an engine driven gear wheel pump 11 is fed into a chamber 12 containing two opposed capsules 13, 14 which are responsive respectively to boost and exhaust back pressure. The capsule 13 is subjected to boost pressure internally, being connected to the induction pipe 15 by a conduit 16, and the other capsule which is of exactly the same external shape and area, is divided into two compartments one of which 14a is partly evacuated and the other 14b subjected internally to exhaust back pressure, being connected to the exhaust pipe 17 by a conduit 18.

These capsules serve, as described in my copending U. S. application Serial No. 638,130, filed December 29, 1945, to adjust the effective area of a metering orifice 25 as a desired function of boost pressure and exhaust back pressure the capsules adjusting a profiled needle 24 through the agency of a pivoted lever 21. Variation of the area of the metering orifice to suit changes in induction temperature are effected by a Bourdon tube unit 20 operated by a thermometer bulb 19 in the induction pipe likewise as described in my copending U. S. application Serial No. 638,130, filed December 29, 1945.

The pump 11 is provided with a diaphragm-operated relief valve 33 in the usual manner, which valve is balanced to atmosphere in this particular case via a vent 34 behind the diaphragm 35. Thus the pump delivery pressure is maintained substantially constant in relation to atmospheric pressure, any excess fuel delivered by the pump being returned from chamber 12 to the suction side via pipe 36.

The pressure difference across the metering orifice is arranged to be substantially proportional to the square of the engine speed utilising the difference of pressure generated across the engine driven centrifugal impeller 37. The pressure at the tip of the impeller is applied via conduit 38 to the upstream side of the orifice and a desired proportion of the impeller eye pressure is applied to the downstream side of the orifice by means of a flexible diaphragm 39 operating a pressure regulating valve 40, as described for example in U. S. Patent No. 2,374,844. The left hand side of the diaphragm 39 is exposed to the impeller eye pressure via a conduit 44, while the right hand side is exposed to the fuel pressure at the exit of the metering orifice.

Adjustment for initial tuning purposes is provided by an orifice 41, adjustable by a screw 42, through which a small quantity of fuel may be allowed to by-pass the metering orifice. A fixed orifice 43 is provided to allow air or vapour which may collect at the eye of the impeller to vent forward to the downstream side of the orifice.

The metered fuel, after passing through the metering orifice, goes through the pressure regulating valve 40 and thence, via pipe 45 and balanced discharge valve 46, to a discharge nozzle 47 through which it is injected into the induction system.

The diaphragm 39 is coupled to the stem of the pressure regulating valve 40 by means of a bell crank lever 48 mounted on a fixed pivot 49. The diaphragm 39 is loaded by a compression spring 50, the compression of which is adjustable by a screw 51.

The biasing spring 50 in this case produces a positive bias on the diaphragm 39 and so provides an enrichment in the fuel flow at slow running. It also serves to maintain across the venting orifice 43 a pressure difference appropriate to produce a small flow of fuel from the eye of the impeller through orifice 43, thereby ensuring venting of air or vapour from the eye of the impeller. I find that approximately the same biasing pressure is required for the slow running adjustment and for satisfactory venting. The force applied by spring 50 to diaphragm 39 exceeds that required to produce the biasing and venting pressure, part of the force being absorbed in balancing the differential pressure exerted by the fuel on the unbalanced-type pressure regulating valve 40.

A lever 52, which turns on a pivot 53, is coupled to the pilot's boost selecting lever, not shown, which operates to select the boost, e. g. as described in U. S. Patent No. 1,995,800. The lever 52 is movable between a slow running position S. R. and a full throttle position F. T. and carries an arm 54 coupled by a link 55 to a bell crank lever 56 for operating an accelerator pump 57. This operates, as described in my copending U. S. application Serial No. 638,129, filed December 29, 1945, to supply extra fuel to the engine through conduit 58 during periods of acceleration.

When the lever 52 is moved anti-clockwise beyond the slow running position, an arm 65 thereon closes a cut-off valve 66, which is normally kept open by a spring 67. 68 is a priming valve and 100 is a valve controlling a vent to atmosphere from the chamber 12. Valve 100 is normally closed, but opens when the pressure in chamber 12 falls below a predetermined value due to the engine having stopped.

Although the positive bias applied by the spring 50 to the diaphragm 39 causes the pressure difference across the metering orifice 25 to deviate to a small extent from the square law, this deviation is of negligible importance at cruising or higher boosts, the rate of flow of fuel through the metering orifice then approaching sufficiently closely to true proportionality to engine speed to meet practical requirements. As already explained, at slow running the metering pressure is much smaller and the deviation from the square law due to the biasing force is then sufficient to effect the enrichment required under these conditions. The extent of enrichment at slow running is of course adjustable by means of the screw 51.

In the modified arrangement shown in Fig. 2 the biassing spring 150 is a tension spring, the tension of which is adjustable by a screw 151. A negative bias is thus applied to the diaphragm 39, and the mixture is therefore weakened at slow running. The spring 150 cannot operate to balance any fuel pressure differential on the pressure regulating valve, so a pressure regulating valve 140 of balanced type is employed in this case. Also, as a negative bias is applied to the diaphragm 39, it is not practicable to vent the eye of the impeller 37 to the downstream side of the metering orifice. Venting therefore takes place to the suction side of the pump through a conduit 243 containing a restricted orifice 143.

The invention is also applicable to the regulation of the flow to an internal combustion engine of other liquids besides fuel which it may be desired to supply in a determined relationship to the airflow, e. g. anti-detonant fluids such as methanol, and the expression "fuel" in the appended claims is to be understood as including such alternative liquids.

What I claim as my invention and desire to secure by Letters Patent is:

1. In a fuel injection system for an internal combustion engine comprising a fuel supply conduit, a fuel metering orifice therein, means for feeding fuel under pressure along said conduit and through said orifice, an engine driven centrifugal impeller for controlling the proportion of fuel in the fuel-air mixture supplied to the engine, a pressure regulating valve on the downstream side of the metering orifice, a pressure responsive device controlling said valve, said pressure responsive device being exposed at one side to the fuel pressure at the exit of the metering orifice, a conduit for subjecting the other side of said device to the pressure at the eye of the impeller, and a conduit connecting the tip of the impeller to the fuel supply conduit at the entry side of the metering orifice, the combination with said pressure responsive device of means for exerting thereon a biasing force which is small in comparison with the fuel pressure difference prevailing across the metering orifice except under slow running conditions.

2. In a fuel injection system for an internal combustion engine, comprising a fuel supply conduit, a fuel metering orifice therein, means for feeding fuel under pressure along said conduit and through said orifice, an engine driven centrifugal impeller for controlling the proportion of fuel in the fuel-air mixture supplied to the engine, a pressure regulating valve on the downstream side of the metering orifice, a diaphragm controlling said valve, said diaphragm being exposed at one side to the fuel pressure at the exit of the metering orifice, a conduit for subjecting the other side of said diaphragm to the pressure at the eye of the impeller, and a conduit connecting the tip of the impeller to the fuel supply conduit at the entry side of the metering orifice, the combination with said pressure sensitive device of a biasing spring arranged to exert on said diaphragm a biasing pressure which is small, under cruising conditions, in comparison with the fuel pressure difference across the orifice but is nevertheless effective to produce a slow running adjustment in the fuel flow.

3. In a fuel injection system for an internal combustion engine, comprising a fuel supply conduit, a fuel metering orifice therein, means for feeding fuel under pressure along said conduit and through said orifice, an engine driven centrifugal impeller for controlling the proportion of fuel in the fuel-air mixture supplied to the engine, a pressure regulating valve on the downstream side of the metering orifice, a diaphragm controlling said valve, said diaphragm being exposed at one side to the fuel pressure at the exit of the metering orifice, a conduit for subjecting the other side of said diaphragm to the pressure at the eye of the impeller, and a conduit connecting the tip of the impeller to the fuel supply conduit at the entry side of the metering orifice, the combination with said pressure sensitive device of a biasing spring arranged to exert on said diaphragm a biasing pressure such that the fuel pressure on the side of the diaphragm connected to the eye of the impeller exceeds that on the other side of the diaphragm, said difference in fuel pressures on the two sides of the diaphragm being small in comparison with the fuel pressure difference across the orifice under cruising conditions of the engine but being sufficient to produce an enrichment in mixture strength at slow running.

4. In a fuel injection system for an internal combustion engine, comprising a fuel supply conduit, a fuel metering orifice therein, means for feeding fuel under pressure along said conduit and through said orifice, an engine driven centrifugal impeller for controlling the proportion of fuel in the fuel-air mixture supplied to the engine, a pressure regulating valve on the downstream side of the metering orifice, a diaphragm controlling said valve, said diaphragm being exposed at one side to the fuel pressure at the exit of the metering orifice, a conduit for subjecting the other side of said diaphragm to the pressure at the eye of the impeller, and a conduit connecting the tip of the impeller to the fuel supply conduit at the entry side of the metering orifice, the combination with said pressure sensitive device of a biasing spring arranged to exert on said diaphragm a biasing pressure such that the fuel pressure on the side of the diaphragm connected to the eye of the impeller is less than that on the other side of the diaphragm, said difference in fuel pressures on the two sides of the diaphragm being small in comparison with the fuel pressure difference across the orifice under cruising conditions of the engine but being sufficient to produce a weakening in mixture strength at slow running.

5. Apparatus as claimed in claim 3, in which the pressure regulating valve is of unbalanced type and the spring serves to counterbalance the forces exerted by the fuel on opposite sides of said valve, in addition to providing the bias on the diaphragm for giving the slow running adjustment.

6. In a fuel injection system for an internal combustion engine comprising a conduit for supplying fuel to the engine, means for feeding fuel under pressure through said conduit, a metering orifice in said conduit, an engine driven centrifugal impeller, a connection from the conduit on the upstream side of the metering orifice to the tip of said impeller, a pressure sensitive device exposed at one side to the fuel pressure at the downstream side of the metering orifice and at the other to the fuel pressure at the eye of the impeller, and a pressure regulating valve in said conduit, said valve being controlled by said pressure sensitive device and being located at the downstream side of the metering orifice, the combination with said impeller and said conduit of a restricted flow vent connection from the eye of said impeller to a point in said conduit between said metering orifice and said pressure regulating valve.

7. In a fuel injection system for an internal combustion engine comprising a conduit for supplying fuel to the engine, means for feeding fuel under pressure through said conduit, a metering orifice in said conduit, an engine driven centrifugal impeller, a connection from the conduit on the upstream side of the metering orifice to the tip of said impeller, a diaphragm exposed at one side of the fuel pressure at the exit from the metering orifice and at the other to the fuel pressure at the eye of the impeller, and a pressure regulating valve in said conduit, said valve being controlled by said diaphragm and being located at the downstream side of the metering orifice, the combination with said impeller and said conduit of a restricted flow vent connection from the eye of said impeller to a point in said conduit between said metering orifice and said pressure regulating valve.

8. In a fuel injection system for an internal combustion engine comprising a conduit for supplying fuel to the engine, means for feeding fuel under pressure through said conduit, a metering orifice in said conduit, an engine driven centrifugal impeller, a connection from the conduit on the upstream side of the metering orifice to the tip of said impeller, a diaphragm exposed at one side of the fuel pressure at the exit from the metering orifice and at the other to the fuel pressure at the eye of the impeller, and a pressure regulating valve in said conduit, said valve being controlled by said diaphragm and being located at the downstream side of the metering orifice, the combination with said impeller, said conduit and said diaphragm of a restricted orifice permitting of flow of fuel from one side to the other of said diaphragm and a biasing spring operating on said diaphragm to establish at the side thereof exposed to the eye of the impeller a fuel pressure in excess of that at the other side thereof.

9. In a fuel injection system for an internal combustion engine, comprising a fuel supply conduit, a fuel metering orifice therein, a pump for feeding fuel under pressure along said conduit and through said orifice, an engine driven centrifugal impeller for controlling the proportion of fuel in the fuel-air mixture supplied to the engine, a pressure regulating valve on the downstream side of the metering orifice, a diaphragm controlling said valve, said diaphragm being exposed at one side to the fuel pressure at the exit of the metering orifice, a conduit for subjecting the other side of said diaphragm to the pressure at the eye of the impeller, and a conduit connecting the tip of the impeller to the fuel supply conduit at the entry side of the metering orifice, the combination with said pressure sensitive device of a biasing spring arranged to exert on said diaphragm a biasing pressure such that the fuel pressure on the side of the diaphragm connected to the eye of the impeller is less than that on the other side of the diaphragm, said difference in fuel pressures on the two sides of the diaphragm being small in comparison with the fuel pressure difference across the orifice under cruising conditions of the engine but being sufficient to produce a weakening in mixture strength at slow running, and a conduit permitting of a restricted flow of fuel from the eye of the impeller to the suction side of the pump.

LEONARD SIDNEY GREENLAND.

REFERENCES CITED

The following references are of record in the file of this patent:

UNITED STATES PATENTS

| Number | Name | Date |
|---|---|---|
| 2,374,844 | Stokes | May 1, 1945 |
| 2,397,984 | Schorn | Apr. 9, 1946 |

FOREIGN PATENTS

| Number | Country | Date |
|---|---|---|
| 429,682 | Great Britain | June 4, 1935 |
| 523,895 | Great Britain | July 25, 1940 |